US 9,836,642 B1

United States Patent
Ramaswamy

(10) Patent No.: US 9,836,642 B1
(45) Date of Patent: Dec. 5, 2017

(54) FRAUD DETECTION FOR FACIAL RECOGNITION SYSTEMS

(71) Applicant: Amazon Technologies, Inc., Reno, NV (US)

(72) Inventor: Sharadh Ramaswamy, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 17 days.

(21) Appl. No.: 14/987,644

(22) Filed: Jan. 4, 2016

Related U.S. Application Data

(63) Continuation of application No. 13/718,649, filed on Dec. 18, 2012, now Pat. No. 9,230,158.

(51) Int. Cl.
| | | |
|---|---|---|
| *G06K 9/00* | (2006.01) | |
| *G06K 9/46* | (2006.01) | |
| *H04N 7/18* | (2006.01) | |
| *H04N 5/232* | (2006.01) | |

(52) U.S. Cl.
CPC ..... *G06K 9/00288* (2013.01); *G06K 9/00234* (2013.01); *G06K 9/46* (2013.01); *H04N 5/23219* (2013.01); *H04N 7/183* (2013.01)

(58) Field of Classification Search
CPC .. G06K 9/00288; G06K 9/46; G06K 9/00234; H04N 5/23219; H04N 7/183
USPC .......................... 382/103, 116, 118, 115, 154
See application file for complete search history.

(56) References Cited

U.S. PATENT DOCUMENTS

| | | | |
|---|---|---|---|
| 6,920,236 B2 | 7/2005 | Prokoski | |
| 7,469,055 B2 | 12/2008 | Corcoran et al. | |
| 7,735,728 B2 | 6/2010 | Wallerstorfer | |
| 7,804,982 B2 | 9/2010 | Howard et al. | |
| 7,924,323 B2 | 4/2011 | Walker et al. | |
| 8,326,001 B2 * | 12/2012 | Free | G06K 9/00228 382/103 |
| 8,396,265 B1 * | 3/2013 | Ross | G06K 9/00214 382/103 |
| 8,411,909 B1 * | 4/2013 | Zhao | G06K 9/00899 382/116 |
| 8,437,513 B1 | 5/2013 | Derakhshani et al. | |
| 8,457,367 B1 * | 6/2013 | Sipe | G06K 9/00221 382/118 |
| 8,548,207 B2 * | 10/2013 | Langley | G06F 21/32 382/115 |
| 8,577,093 B2 | 11/2013 | Friedman et al. | |
| 8,594,374 B1 | 11/2013 | Bozarth | |
| 8,644,564 B1 * | 2/2014 | Patton | G06K 9/00228 382/118 |

(Continued)

*Primary Examiner* — Sheela C Chawan
(74) *Attorney, Agent, or Firm* — Polsinelli LLP

(57) ABSTRACT

Approaches are described which enable a computing device (e.g., mobile phone, tablet computer) to utilize one or more facial recognition techniques to control access to the device and to detect when artificial representations of a user, such as a picture or photograph, are being used in an attempt to gain access to the device. Evidence indicative of artificial representations may include lack of changes in facial skin color between multiple images captured by a camera, ability to track one or more features of the human face while the camera is rotated or moved, presence of secular reflections caused by an illumination device, absence of shadows in the image, and others.

20 Claims, 7 Drawing Sheets

(56) References Cited

U.S. PATENT DOCUMENTS

| | | | |
|---|---|---|---|
| 8,831,295 B2* | 9/2014 | Coons | H04N 5/33 382/118 |
| 8,984,622 B1 | 3/2015 | Baldwin et al. | |
| 9,230,158 B1 | 1/2016 | Ramaswamy | |
| 9,524,421 B2* | 12/2016 | Ross | G06K 9/00288 |
| 9,697,414 B2 | 7/2017 | Baldwin et al. | |
| 2003/0163289 A1 | 8/2003 | Whelan et al. | |
| 2004/0037450 A1 | 2/2004 | Bradski | |
| 2006/0147094 A1 | 7/2006 | Yoo | |
| 2006/0288234 A1 | 12/2006 | Azar et al. | |
| 2007/0092115 A1 | 4/2007 | Usher et al. | |
| 2007/0237360 A1 | 10/2007 | Irie et al. | |
| 2008/0247609 A1 | 10/2008 | Feris et al. | |
| 2009/0003652 A1 | 1/2009 | Steinberg et al. | |
| 2010/0007665 A1 | 1/2010 | Smith et al. | |
| 2010/0166310 A1 | 7/2010 | Chan et al. | |
| 2011/0262001 A1 | 10/2011 | Bi et al. | |
| 2011/0268350 A1* | 11/2011 | Tsukada | H04N 1/6086 382/154 |
| 2011/0317872 A1 | 12/2011 | Free | |
| 2013/0167212 A1 | 6/2013 | Azar et al. | |
| 2016/0335483 A1* | 11/2016 | Pfursich | G06K 9/00899 |

* cited by examiner

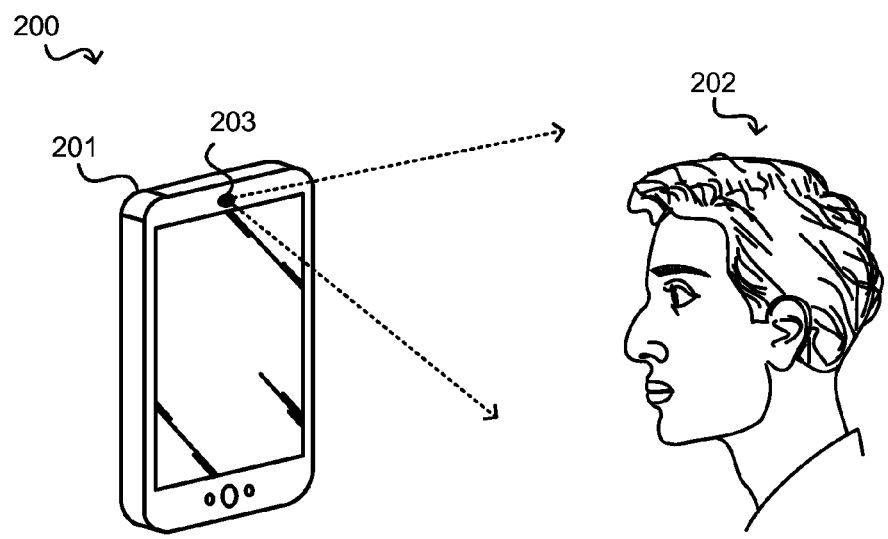
FIG. 2A
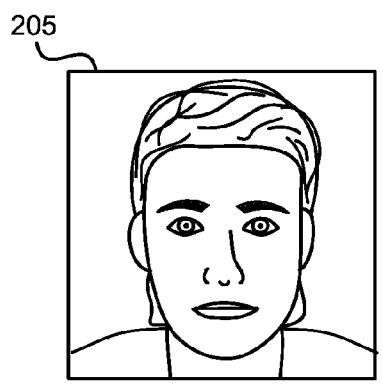   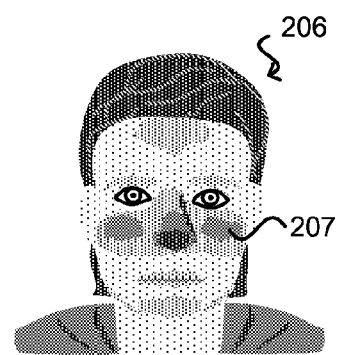
FIG. 2B     FIG. 2C

FRAUD DETECTION FOR FACIAL RECOGNITION SYSTEMS

CROSS-REFERENCES TO RELATED APPLICATIONS

This application is a continuation of U.S. application Ser. No. 13/718,649, filed Dec. 18, 2012, which is hereby expressly incorporated herein by reference in its entirety.

BACKGROUND

Conventional facial recognition systems can be used for automatically identifying or verifying a person based on a digital image showing a front view of that person's face. One way to identify the person is by comparing a selected set of facial features, or feature points, from the image to a database of features. Facial recognition systems have been used for a variety of purposes, including for controlling access to secured systems. However, conventional facial recognition systems have a number of shortcomings. For example, one way to potentially trick or "spoof" a facial recognition system is to present a two dimensional representation (e.g., picture, photograph, etc.) of a person in front of the camera, where the image captured by the camera shows a front view of that person, causing the system to identify the user based on the features in the picture or photograph. This can be undesirable since a malicious user may be able to gain access to the secured system by simply procuring a picture or other artificial representation of an authorized user.

BRIEF DESCRIPTION OF THE DRAWINGS

Various embodiments in accordance with the present disclosure will be described with reference to the drawings, in which:

FIGS. 2A, 2B and 2C illustrate an example of a computing device detecting an artificial representation of a human face in an image based on changes in facial skin color, in accordance with various embodiments;

DETAILED DESCRIPTION

Figure 1:
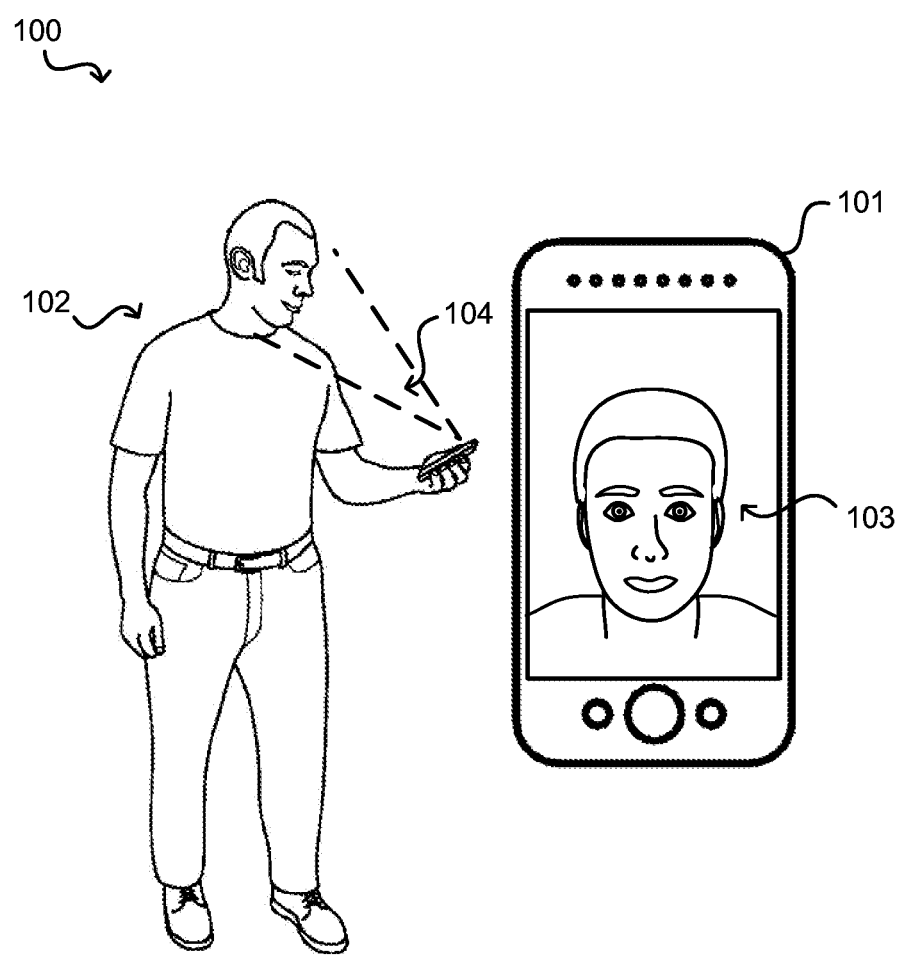
FIG. 1 illustrates an example of a user holding a portable computing device, such as a mobile phone, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for managing security, such as ones that may utilize facial recognition-based access control in an electronic environment. In particular, various approaches discussed herein enable a computing device (e.g., mobile phone, tablet computer) to utilize one or more facial recognition techniques to control access to the device, including data, functionality, network connectivity, or other aspects of the device, and to detect when an artificial representation of a user, such as a picture or photograph, is being used in an attempt to gain access to the device.

The use of portable computing devices, such as mobile phones and tablet computers, has become increasingly pervasive in all aspects of everyday life for most consumers. Conventionally, these devices are secured by requiring a user to either enter a password or draw a pre-specified pattern on a touch screen in order to unlock and gain access to the device. However, it is often inconvenient for the user to have to remember a password or the pattern to draw. For example, a user may have numerous other passwords that are used for other purposes and it is difficult for the user to have to remember each separate password or pattern to enter. In various embodiments described herein, one or more facial recognition techniques can be utilized to secure the device without the need for a password or other pattern that may be difficult for the user to remember. For example, the computing device can be unlocked whenever an image of an authorized user is detected to be captured by the camera of the device, such as when the authorized user holds the camera (e.g., front-facing camera) directly in front of the user's face. However, as previously mentioned, it is desirable to prevent malicious or unauthorized users from attempting to gain access to the device by presenting an artificial representation (e.g., picture, photograph, mask, etc.) of an authorized user.

In accordance with an embodiment, the computing device can be locked and/or unlocked using at least one of the facial recognition techniques described herein. In one embodiment, once the device has been locked (or otherwise secured), the user can activate a facial recognition mode of the device, such as by pressing a button, making a predetermined gesture in front of the device, making a predetermined motion of the device, or the like. When in this mode, the device can capture an image of the user and grant or deny access to the user based at least in part on detecting an authorized user's face (or a portion thereof) contained in the image. In various embodiments, the facial recognition can be performed based on a single image or based on multiple images, such as a sequence of frames in a video recording.

Once the computing device captures the image, it may apply one or more facial recognition algorithms to compare the features of the human face in the image to a stored model of at least one user that has been previously authorized to access the device. Any number of facial recognition algorithms known in the art can be utilized to compare the image to the model of the authorized user. For example, a facial recognition algorithm may analyze the relative position, size, and/or shape of the eyes, nose, cheekbones, and jaw. These features can then be compared to the relative position, size and/or shape of the features of the authorized user, as defined in a model stored in the memory of the computing device (or retrieved from a remote location, such over a network connection). If the features match to a threshold degree of certainty, the device can enable the user access.

In various embodiments, to prevent unauthorized users from gaining access to the device, the computing device can employ a number of techniques to detect when the image captured by the camera of the device contains evidence indicative of an artificial representation of a human face. The computing device can analyze image data captured over a period of time to detect changes in one or more characteristics (e.g., skin color, specular reflections, shadows, red-eye etc.) of the human face contained in the image. Based on these changes in the characteristics, the computing device can detect evidence indicative of whether an artificial representation of a human face is being presented to the camera. As used herein, artificial representations can include any picture, photograph, mask or other rendering of the human face or a portion thereof. When the computing device detects that the image contains evidence indicative of an artificial representation, the device can prevent access to at least one function of the device, issue an alert, notify an external entity, and/or the like.

In accordance with one embodiment, the device can attempt to detect one or more changes in facial skin color and/or tone and use that information to determine whether an artificial representation of the human face has been placed in front of the camera. This approach may detect both two dimensional (2D) artificial representations (e.g., pictures, photographs) and three dimensional artificial representations (e.g., face mask). One property of an artificial representation of a human face is that there is no change of skin color (e.g., shade, tone) through time, which ordinarily occurs as a person breathes. In this embodiment, the computing device can detect subtle changes in facial skin color by performing an image signal analysis, such as a Eulerian signal analysis. For example, the computing device uses the camera (e.g., front-facing camera) to capture two or more images of the human face over a specified time interval (e.g., several seconds). The device can then compare the images to determine whether any changes in facial skin color (e.g., tone, shade) are present between the two or more images. In some cases, the computing device may amplify the color variations in different images by applying temporal filtering and/or other techniques. If no changes in color are present between a certain number (e.g., two or more) of images, the device may deny access to the user on the assumption that the images contain data for an artificial representation of a human face. If the device is able to identify changes in color between the several images, the device can enable access to the user on the assumption that the images contain data corresponding to a real human face.

In accordance with another embodiment, the computing device can detect evidence of an artificial two dimensional representation by tracking one or more features or feature points between several images using a homography. One property of two-dimensional artificial representations, such as smooth, flat surfaces, is that when the camera is rotated and/or moved, the features on the surface can be tracked from frame-to-frame by means of a homography estimated from detected corners or other features in the image. In one embodiment, the ability to consistently track the object under camera rotations and movements indicates the presence of a flat structure (i.e. artificial representation). Conversely, the inability to track such features or objects indicates the presence of a three-dimensional structure. In this embodiment, the computing device captures two or more images using the camera while the camera is rotated or otherwise moved by the user between the capture of each image. For example, the user may be instructed to slightly turn the device several times while facing the camera in order to unlock the device. The computing device then attempts to track one or more features (e.g., relative distances between eyes, nose, etc.) between images being captured by the device by using a homography. If the computing device is able to track the features between two or more images (indicating a presence of a 2D representation), the device can deny access to the user. Otherwise, access can be granted to the user.

In accordance with another embodiment, the computing device can detect evidence of artificial representations by utilizing a flash or other illumination device embedded in the device. For example, one property of many artificial two-dimensional representations is that smooth, flat surfaces (especially glossy surfaces) create specular reflections when flashed or illuminated with a light source. As used herein, a specular reflection is a reflection of light (or other wave) from a surface, in which light from a single incoming direction is reflected into an outgoing direction that can be detected in the image. Specular reflections on an artificial flat surface usually have a characteristic pattern that is comprised of a central patch (substantially circular in shape) with saturated intensities, with the intensity gradually decreasing and blending into the background image towards the edges of the patch. The presence of such patterns indicates an artificial smooth flat surface, unlike a natural human face, which is textured and does not ordinarily cause such specular reflections. In this embodiment, the computing device activates an illumination device (e.g., flash, infrared light emitting diode, etc.) to produce light in an area within a field of view of the camera. The device then determines whether the image contains one or more specular reflections caused by the light produced by the illumination device. If the device detects any such specular reflections, it prevents access to the user. Otherwise, access can be allowed.

In accordance with another embodiment, the computing device can detect one or more shadows produced by the flash or other illumination device to verify the presence of a three-dimensional object. One property of an artificial two-dimensional representation is that smooth, flat surfaces do not create shadows when a light source is projected on the surface because flat surfaces contain no three-dimensional structure. This allows a computing device to use flashes or other light sources detect the presence of an artificial two-dimensional representation. If no shadows are detected, the object in front of the camera can be assumed to be a flat object (i.e., artificial representation). In this embodiment, the device activates the illumination device to produce light in an area within a field of view of the camera and captures an image of that area. The device can then analyze the image to detect a presence of one or more shadows in the image caused by the light produced by the illumination device. If shadows are detected, the computing device can enable access to the user, otherwise if no shadows are detected, the device may deny access.

In accordance with another embodiment, the computing device can detect a red-eye effect in the image to verify the presence of an actual human face as opposed to an artificial representation. Red-eye effect is a commonly occurring effect where a person's pupils appear red in an image captured by a camera. Red-eye effect may be caused by the flash of the camera or by some other illumination device. In this embodiment, the computing device can analyze the image to determine whether any red-eye effect is present. If the computing device detects the presence of the red-eye effect, it can grant access to the user on the assumption that the image contains a real human face. Otherwise, access can be denied or otherwise controlled using one of the other techniques described throughout this disclosure. In one embodiment, the presence of red-eye may be sufficient to verify that the image contains a real human face, however, the absence of red-eye effect may not necessarily indicate an artificial representation. In that case, more tests may be performed by the device to verify the user, such as the presence of one or more shadows in the image that would normally be caused by the flash, or the like.

FIG. 1 illustrates an example 100 of a user holding a portable computing device, such as a mobile phone, in accordance with various embodiments. In the illustrated embodiment, the user 102 is holding a handheld mobile phone 101 (e.g., smart phone) that includes at least one digital camera. The digital camera may be a front-facing camera positioned in such a way that the user's face is within the camera's field of view 104 when the user 102 holds the computing device 101 directly in front of him to view the information on the display screen 103. In this particular illustration, the display screen 103 of the computing device 101 is displaying an image of the user 102 within the field of view 104 of the front-facing camera. For example, the user may use the front-facing camera to capture a self-portrait image, conduct a video phone call or perform various other functions using the device. In various embodiments described herein, the images captured by the front-facing camera of computing device 101 can be used to enable the user to access the device 101 (i.e., unlock the device) by applying one or more facial recognition algorithms to identify the user 102.

FIGS. 2A, 2B and 2C illustrate an example 200 of a computing device detecting an artificial representation of a human face in an image based on changes in facial skin color, in accordance with various embodiments. In FIG. 2A, the computing device 201 (e.g., mobile phone) having a front-facing camera 203 can use facial recognition to identify the user 202 of the device and to grant access to one or more functions of the device 201, as previously described. In various embodiments, however, it is also desirable to prevent unauthorized users from using an artificial representation, such as a picture 205 to gain access to the device 201. In the illustrated embodiment, the computing device can detect one or more changes in facial skin color (e.g., shade, tone etc.) and use the information about the skin color changes to determine when an artificial representation of the human face has been placed in front of the camera 203 of the device 201. This approach may detect both two dimensional (2D) artificial representations (e.g., pictures, photographs) and three dimensional artificial representations (e.g., face mask).

In accordance with an embodiment, the computing device captures two or more images over a period of time, where each image contains data corresponding to a human face, or a portion thereof. The image data may be a result of a real user's face 202 or an artificial representation of a human face 205 placed in front of the camera. The computing device 201 can detect subtle changes in facial skin color by performing a signal analysis (e.g., Eulerian signal analysis) of the image data in the several images captured by the camera. In one embodiment, the device compares the several images to determine whether any changes in color, tone and shade are present between the two or more images. As illustrated in FIG. 2B, multiple sequential images of the same artificial representation of a human face 205 will contain no changes in the facial skin color between the images. The image 206 of FIG. 2C, however, illustrates changes in facial skin color 207 that ordinarily occur over time due to breathing, blood circulation, pulse rate and the like. For example, the red values of a human face can vary with the pulse cycles as the amount of blood flow to the face varies. While this variation may be too subtle to be noticed by the human eye, some digital cameras of a computing device 201 can be sensitive enough to detect the variations in skin color. These variations then can be used to verify that captured image information reflects an actual person, and not an artificial representation of a person placed in front of the camera.

In the illustrated embodiment, if no changes in facial skin color 207 are detected between a predetermined number of images (e.g., 2 or more images), the device 201 may deny access to the user based on the assumption that the images contain data for an artificial representation of a human face. If facial skin color changes are detected, however, the computing device 201 can enable the user 202 to access the device.

Figure 3A:
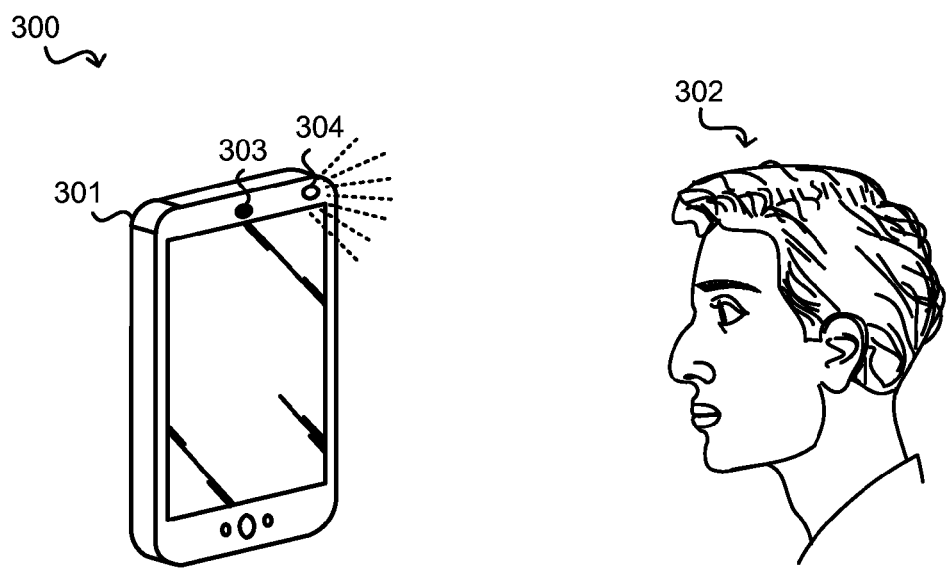
FIGS. 3A, 3B and 3C illustrate an example of a computing device utilizing a flash to detect an artificial representation of a human face in an image, in accordance with various embodiments.
Figures 3B, 3C:
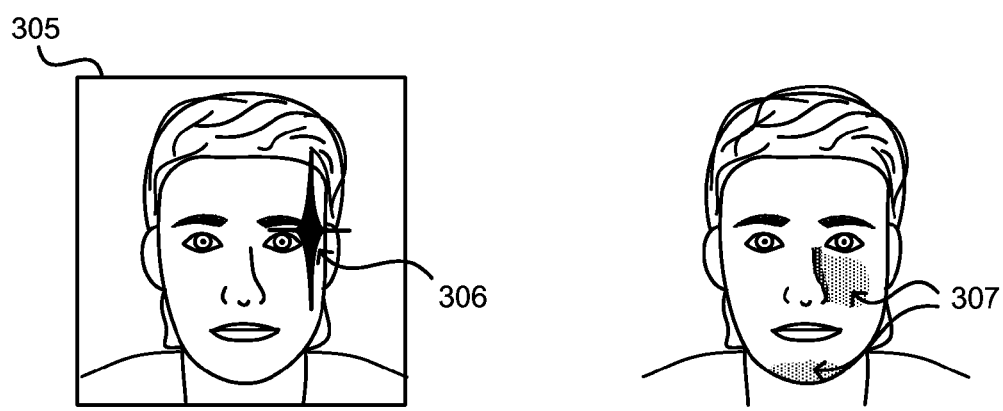

FIGS. 3A, 3B and 3C illustrate an example 300 of a computing device utilizing a flash to detect an artificial representation of a human face in an image, in accordance with various embodiments. As illustrated in FIG. 3A, the computing device 301 may include a flash or other illumination device 304 in addition to the digital camera 303. The flash 304 can be used to produce light in an area within the field of view of the digital camera 303.

If the flash (or other illumination device) illuminates a two-dimensional representation of a human face on a smooth and flat surface, such as a picture or a photograph of an authorized user, the flat surface will create specular reflections. As previously described, a specular reflection is any reflection of light from a surface, in which light from a single incoming direction is reflected into an outgoing direction. FIG. 3B illustrates an example of a specular reflection 306 in an image 305 which was caused by a flash or other illumination device, in accordance with various embodiments. Specular reflections, such as reflection 306, on a smooth artificial surface usually have a characteristic pattern that is comprised of a central patch (substantially circular in shape) with saturated intensities, with the intensity gradually decreasing and blending into the background image towards the edges of the patch. It should be noted that the shape of the specular reflection 306 in FIG. 3B does not necessarily correspond to the actual shape of any secular reflection, but is being shown for illustrational purposes only. The presence of such secular reflections indicates an artificial smooth flat surface, unlike a natural human face, which is textured and does not ordinarily cause such specular reflections.

If the flash illuminates a three-dimensional object, such as a real human face, the flash will produce one or more shadows in the image. FIG. 3C illustrates an example of one or more shadows 307 caused by a flash or other illumination device, in accordance with various embodiments. In this manner, the presence of shadows indicates a three dimensional object, while the absence of any shadows may indicate a two dimensional representation of a human face.

In the illustrated embodiment, the computing device activates an illumination device (e.g., flash, infrared light emitting diode, etc.) to produce light in an area within a field of view of the camera. The device 301 may then detect whether the image contains one or more specular reflections or one or more shadows caused by the light produced by the illumination device. If the device 301 detects any specular reflections, access is denied to the user because specular reflections are evidence indicative of a two dimensional artificial representation placed in front of the camera 303. If, instead, the device 301 detects one or more shadows, access can be provided to the user 302 because shadows are evidence indicative of a three dimensional object, such as a real human face.

Figure 4A:
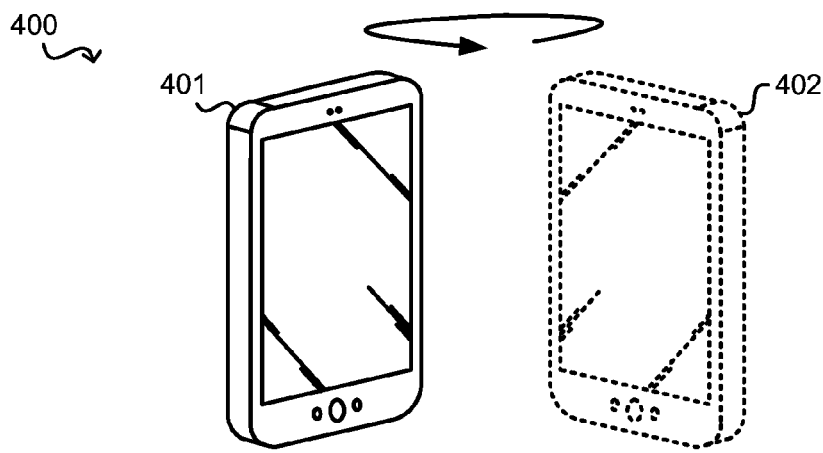
FIGS. 4A, 4B and 4C illustrate an example of a computing device tracking one or more features between multiple images to detect an artificial representation of a human face, in accordance with various embodiments.
Figure 4B:
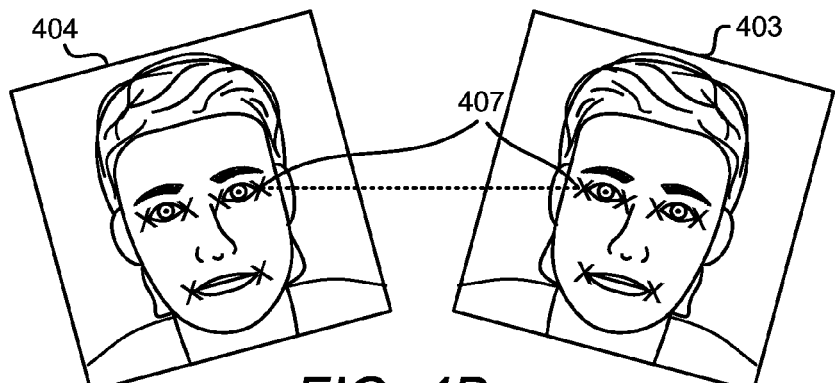
Figure 4C:
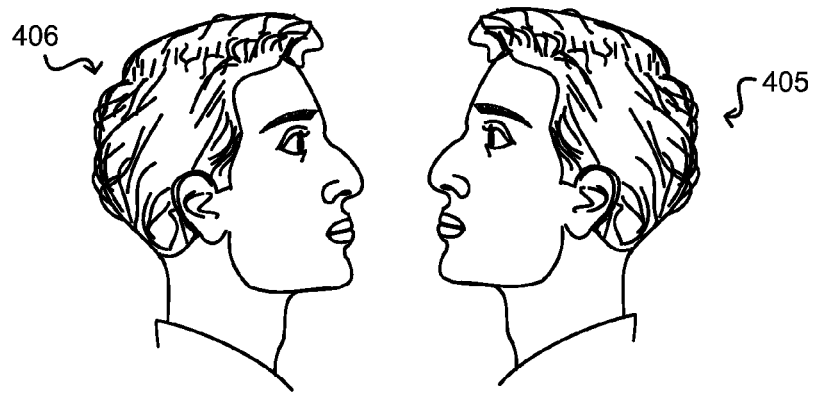

FIGS. 4A, 4B and 4C illustrate an example 400 of a computing device tracking one or more features between multiple images to detect an artificial representation of a human face, in accordance with various embodiments. In the illustrated embodiment, the computing device tracks one or more features between several images using a homography. As used herein, a homography is a relationship between any two images of the same planar surface in space. A homography can be computed based on at least two or more points on a surface and any two images of the same two-dimensional artificial representation of a user's face will share the same homography, regardless of the angle, movement or rotation of the camera. However, images of a three-dimensional user's face that have been captured while the camera was moved or rotated will not share the same homography.

In accordance with the illustrated embodiment, the computing device 401 can instruct the user to rotate and/or move the device while keeping their face within the field of view of the camera in order to unlock the device. FIG. 4A illustrates an example of the computing device rotating to alter the angle of the image captured using the camera, in accordance with various embodiments. As the user rotates the computing device 401, the computing device 401 may sequentially capture two or more images that contain data corresponding to a human face. If the two or more images capture a 2D representation of a human face, they will share the same homography. FIG. 2B illustrates an example of images 403 and 404 that share the same homography, in accordance with various embodiments. If, on the other hand, the images capture a 3D object, such as a human face, the images will no longer share the same homography. FIG. 2C illustrates an example of images 405 and 406 that do not share the same homography, in accordance with various embodiments.

In the illustrated embodiment, the computing device 401 attempts to track one or more features or feature points 407 (e.g., relative distances between eyes, nose, etc.) between the two or more images being captured by the device by using a homography. For example, as illustrated in this example, the computing device may attempt to track the corners of the eyes and the nose by computing a homography based on those feature points. Alternatively, the computing device may attempt to track various other feature points on the face, such as the nose, forehead, corners of the hairline, various distinctive features (e.g., moles, skin blemishes) and the like. The ability to consistently track the object under camera rotations and movements indicates the presence of a flat structure (i.e., an artificial picture of a face placed in front of the camera). Conversely, the inability to track such features or points indicates the presence of a three dimensional structure, such as a real human face. In accordance with an embodiment, if the computing device 401 is able to track the features between two or more images, the device denies access to the user. Otherwise, access can be granted to the user.

In some embodiments, a minimum threshold number of feature points can be tracked by the computing device before the computing device can positively determine the presence of the artificial representation. For example, if the computing device were to track only two feature points on a forehead of the user, the device may be able to successfully track those feature points even though they are actually points on a real human face (due to the forehead being somewhat flat). In order to account for this, the device may utilize a threshold minimum number of feature points and/or a threshold geographical distribution of those feature points before detecting an artificial surface. For example, the computing device may attempt to track the points at the corners of the eyes, the corners of the mouth, the nose and hairline of the user. If all of those feature points can be successfully tracked using a homography, then the device can positively determine that it is tracking an artificial two-dimensional representation of the human face. Otherwise, if only a portion of those points can be tracked, the device may still decide to enable access to the user, perhaps subject to additional tests as described herein.

Figure 5:
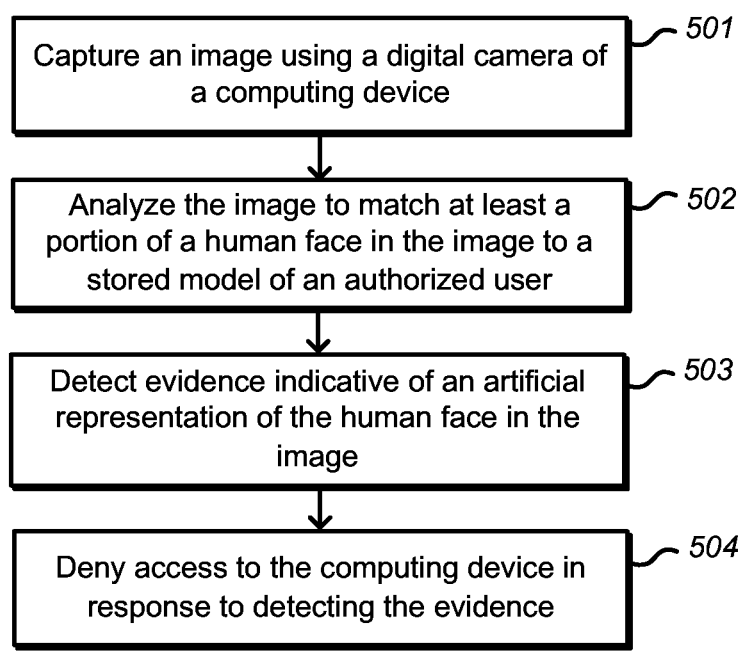
FIG. 5 illustrates an example of a process for utilizing facial recognition fraud detection, in accordance with various embodiments.

FIG. 5 illustrates an example of a process for utilizing facial recognition fraud detection, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the computing device captures an image by using a digital camera embedded in the device. In one embodiment, the camera may be a front-facing camera of a mobile phone. The camera may include a flash or other illumination device, such as a light emitting diode (LED), infrared light source, or the like. The image captured by the camera contains data corresponding to at least a portion of a human face.

In operation 502, the computing device analyzes the image captured by the camera to match the human face (or portion thereof) contained in the image to a model of an authorized user's face. The model may be stored in memory of the computing device, or may be retrieved from a remote location, such as over a network connection. Any facial recognition algorithm known in the art may be utilized to match the human face in the image to the model of an authorized user's face in accordance with various embodiments.

In operation 503, the computing device detects evidence indicative of an artificial representation of a human face in the image. As previously described, in various embodiments, the evidence indicative of an artificial representation may include lack of changes in facial skin color between multiple images, the ability to track one or more features of the human face while the camera is rotated/moved, the presence of secular reflections caused by an illumination device, the absence of shadows, and the like.

In operation 504, the computing device denies access to the user in response to detecting evidence indicative of an artificial representation of the human face. For example, if the device detects any secular reflections in the image, the device may deny access to the user. Similarly, if the device detects the absence of facial skin color changes between two or more images, the device may deny access to the user.

Figure 6:
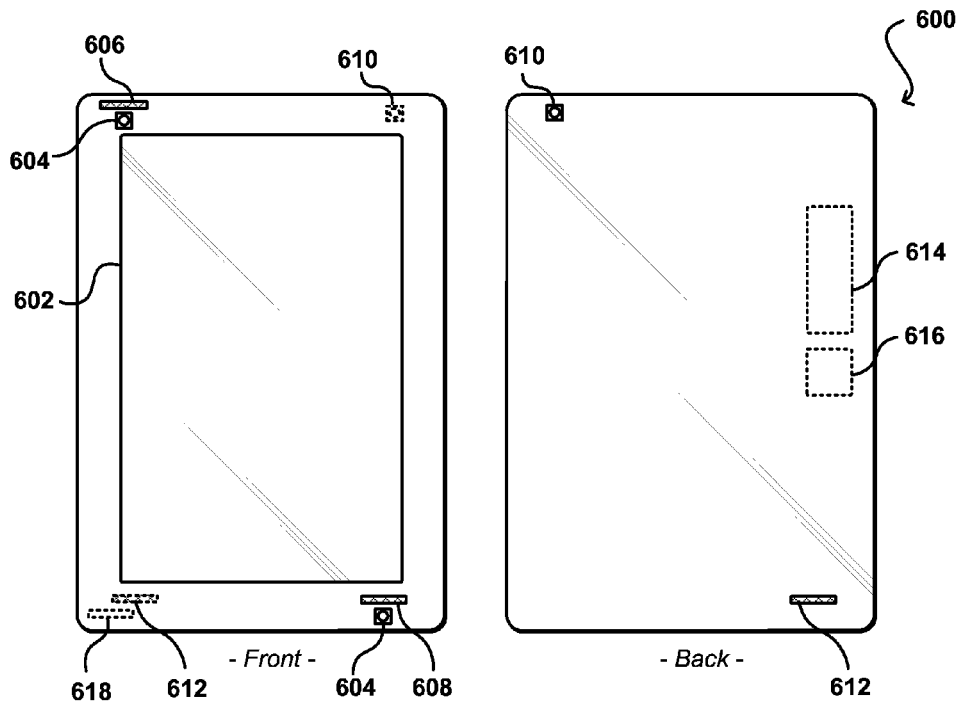
FIG. 6 illustrates front and back views of an example portable computing device that can be used in accordance with various embodiments.

FIG. 6 illustrates front and back views of an example portable computing device 600 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 600 has a display screen 602 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 610 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 604 on the "front" of the device and one image capture element 610 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 606 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 600 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 614, such as may include at least one wired or wireless component operable to communicate with one or more portable computing devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
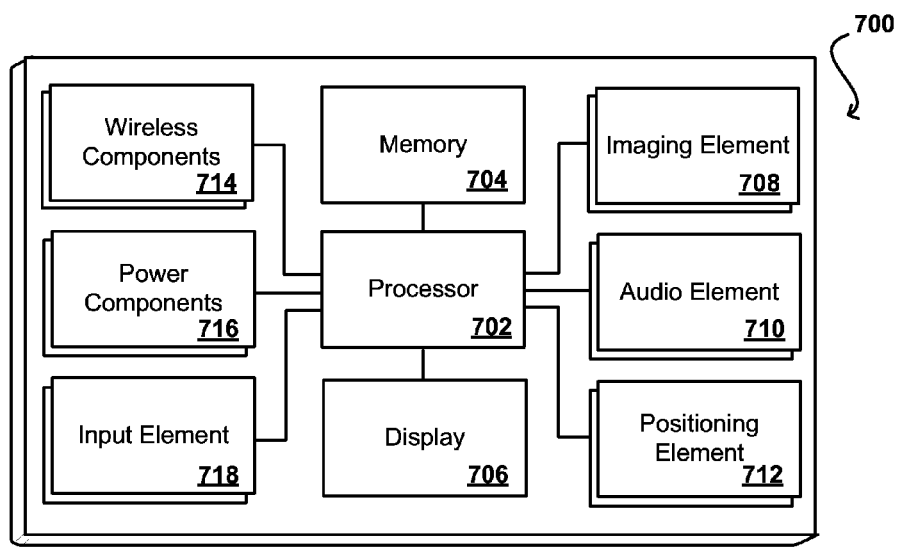
FIG. 7 illustrates an example set of basic components of a portable computing device, such as the device described with respect to FIG. 6.

In order to provide functionality such as that described with respect to FIG. 6, FIG. 7 illustrates an example set of basic components of a portable computing device 800, such as the device 600 described with respect to FIG. 6. In this example, the device includes at least one processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 712 that provides information such as a position, direction, motion, or orientation of the device. This positioning element 712 can include, for example, accelerometers, inertial sensors, electronic gyroscopes, electronic compasses, and GPS elements.

The device can include at least one additional input device 718 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
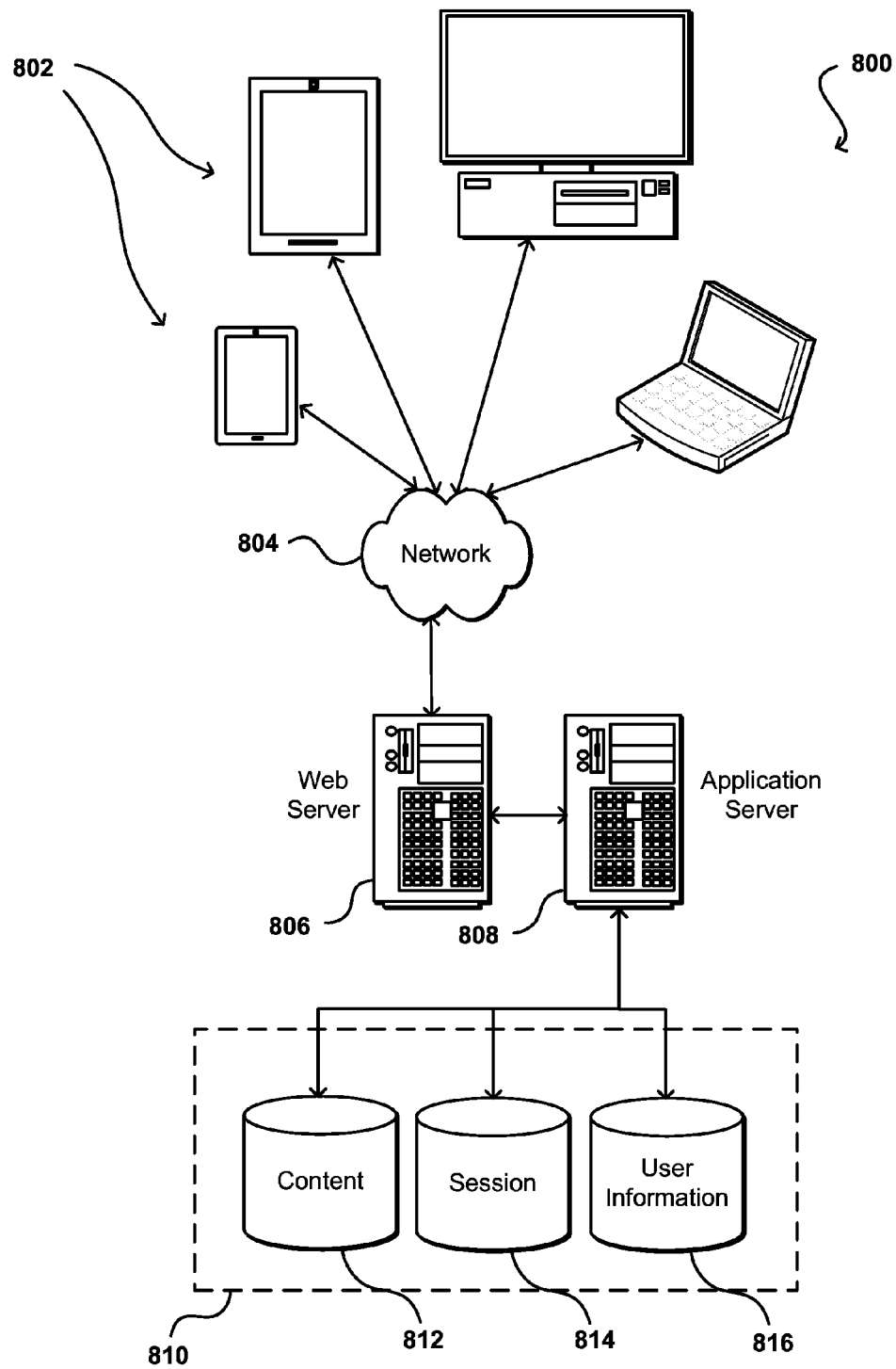
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the client device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a camera;
an illumination device;
at least one processor; and
memory including instructions that, when executed by the at least one processor, cause the computing device to:
activate a facial recognition mode to control access to the computing device;
activate the illumination device to emit light to an area within a field of view of the camera;
capture an image of the area using the camera, the image containing first image data corresponding to at least a portion of a human face;
analyze the first image data to match the first image data corresponding to the at least the portion of the human face to a stored model corresponding to a face of an authorized user of the computing device;
detect evidence in the first image data indicative of an artificial two dimensional representation of the human face presented to the camera, wherein the evidence is based at least in part on the light generated by the illumination device, the evidence including at least one or more specular reflections caused by the light emitted by the illumination device, a pattern of the specular reflections having a characteristic of a flat surface; and
deny the access to the computing device in response to detecting that the evidence in the image indicates the artificial two dimensional representation presented to the camera.

2. The computing device of claim 1, wherein the memory further includes instructions that, when executed by the at least one processor, cause the computing device to:
generate, using the camera, second image data corresponding to at least a portion of a human face;
analyze the second image data to match the second image data corresponding to the at least the portion of the human face to a stored model corresponding to a face of an authorized user of the computing device; and
determine that an actual human face is presented to the camera based at least in part on evidence of one or more shadows in the second image data caused by the light emitted by the illumination device.

3. The computing device of claim 2, wherein the memory further includes instructions that, when executed by the at least one processor, cause the computing device to:
allow access to at least one function of a computing device based at least on the evidence of one or more shadows in the second image data.

4. The computing device of claim 1, wherein the memory further includes instructions that, when executed by the at least one processor, cause the computing device to:
generate second image data representing the human face using the camera;
generate third image data representing the human face using the camera; and
detect one or more changes in facial skin color in the human face based at least in part on comparing the second image data and the third image data.

5. The computing device of claim 4, wherein the memory further includes instructions that, when executed by the at least one processor, cause the computing device to:

determine that an actual human face is presented to the camera based at least in part on the one or more changes in facial skin color; and allow access to at least one function of the computing device.

6. A computer implemented method, comprising:
under the control of one or more computer systems configured with executable instructions,
causing light to be emitted by an illumination component;
generating first image data, using a camera, the first image data representing at least a portion of a human face;
analyzing the first image data to identify the portion of the human face;
detecting one or more specular reflections in the first image data associated with the light; and
preventing access to at least one function of a computing device based at least in part on the detecting one or more specular reflections, a pattern of the specular reflections having a characteristic of a flat surface.

7. The computer implemented method of claim 6, further comprising:
generating, using the camera, second image data representing the human face;
generating, using the camera, third image data representing the human face; and
detecting one or more changes in facial skin color in the human face based at least in part on comparing the second image data and the third image data.

8. The computer implemented method of claim 7, further comprising:
allowing access to at least one function of a computing device based at least in part on the detecting one or more changes in facial skin color.

9. The computer implemented method of claim 6, further comprising:
causing the light to be emitted in an area within a field of view of the camera;
generating, using the camera, second image data of the human face; and
detecting a presence of one or more shadows in the second image data.

10. The computer implemented method of claim 9, further comprising:
determining that an actual human face is presented to the camera based at least in part on the one or more shadows in the second image data; and
allowing access to at least one function of a computing device based at least in part on the one or more shadows in the second image data.

11. The computer implemented method of claim 6, further comprising:
generating second image data using the camera;
generating third image data using the camera, the third image data generated with the camera having been at least one of: rotated or moved after generating the second image data; and
tracking a threshold number of features between the second image data and the third image data using a homography.

12. The computer implemented method of claim 6, further comprising:
causing the light to be emitted in an area within a field of view of the camera; and
detecting, in the first image data, the one or more specular reflections, wherein the one or more specular reflections indicate a flat surface on which a two dimensional representation of the human face is rendered.

13. The computer implemented method of claim 6, further comprising:
matching the first image data representing the human face to a stored model of a face of an authorized user of the computing device.

14. A computing device, comprising:
a camera;
an illumination component;
at least one processor; and
memory including instructions that, when executed by the at least one processor, cause the computing device to:
cause light to be emitted by the illumination component;
generate first image data, using the camera, the first image data representing at least a portion of a human face;
analyze the first image data to identify the portion of the human face;
detect one or more specular reflections in the first image data associated with the light; and
prevent access to at least one function of the computing device based at least in part on the one or more specular reflections, a pattern of the specular reflections having a characteristic of a flat surface.

15. The computing device of claim 14, wherein the memory further includes instructions that, when executed by the at least one processor, cause the computing device to:
generate second image data representing the human face;
generate third image data representing the human face; and
detect one or more changes in facial skin color in the human face based at least in part on comparing the second image data and the third image data.

16. The computing device of claim 15, wherein the memory further includes instructions that, when executed by the at least one processor, cause the computing device to:
allow access to at least one function of the computing device based at least in part on the detecting one or more changes in facial skin color.

17. The computing device of claim 14, wherein the memory further includes instructions that, when executed by the at least one processor, cause the computing device to:
cause the light to be emitted in an area within a field of view of the camera;
generating second image data of the human face; and
detect a presence of one or more shadows in the second image data.

18. The computing device of claim 17, wherein the memory further includes instructions that, when executed by the at least one processor, cause the computing device to:
determine that an actual human face is presented to the camera based at least in part on the one or more shadows in the second image data; and
allow access to at least one function of a computing device based at least in part on the one or more shadows in the second image data.

19. The computing device of claim 14, wherein the memory further includes instructions that, when executed by the at least one processor, cause the computing device to:
generate second image data and third image data using the camera, the third image data captured with the camera having been at least one of: rotated or moved after generating the second image data; and track a threshold number of features between the second image data and the third image data using a homography.

20. The computing device of claim 14, wherein the memory further includes instructions that, when executed by the at least one processor, cause the computing device to:
cause the light to be emitted in an area within a field of view of the camera; and
detect, in the first image data, the one or more specular reflections, wherein the one or more specular reflections indicate a flat surface on which a two dimensional representation of the human face is rendered.

* * * * *